(12) United States Patent
Lopez et al.

(10) Patent No.: US 8,931,824 B2
(45) Date of Patent: Jan. 13, 2015

(54) PEDESTRIAN-FRIENDLY STRUCTURE FOR MOTOR VEHICLE FRONT END

(71) Applicant: Ford Global Technologies, LLC, Dearborn, MI (US)

(72) Inventors: Martin D. Lopez, Sterling Heights, MI (US); Vincent Robert Mahe, South Lyon, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/792,919

(22) Filed: Mar. 11, 2013

(65) Prior Publication Data

US 2014/0252802 A1 Sep. 11, 2014

(51) Int. Cl.
*B60R 21/34* (2011.01)

(52) U.S. Cl.
CPC ..................................... *B60R 21/34* (2013.01)
USPC .................. 296/187.04; 293/117; 296/193.09

(58) Field of Classification Search
CPC .............................. B62D 29/043; B62D 25/08
USPC ............... 296/193.1, 187.04, 187.03, 187.09, 296/203.02, 193.09, 29; 280/68.4; 293/117, 293/155, 115; 180/68.6
See application file for complete search history.

(56) References Cited

U.S. PATENT DOCUMENTS

| | | | | |
|---|---|---|---|---|
| 5,385,212 A * | 1/1995 | Cady et al. | ............. | 180/69.21 |
| 6,273,496 B1 * | 8/2001 | Guyomard et al. | ...... | 296/193.09 |
| 6,357,821 B1 * | 3/2002 | Maj et al. | ................. | 296/193.09 |
| 6,386,624 B1 * | 5/2002 | Schultz et al. | ............. | 296/193.1 |
| 6,412,855 B1 * | 7/2002 | Cantineau et al. | ........ | 296/187.01 |
| 6,523,886 B2 * | 2/2003 | Hoffner et al. | ........... | 296/203.02 |
| 6,802,556 B2 * | 10/2004 | Mattsson et al. | ......... | 296/187.09 |
| 6,880,882 B2 * | 4/2005 | Andre et al. | ............. | 296/193.09 |
| 6,893,064 B2 * | 5/2005 | Satou | ............................. | 293/132 |
| 7,008,008 B2 * | 3/2006 | Andre et al. | ............. | 296/203.02 |
| 7,044,517 B2 * | 5/2006 | Hyuga | ........................ | 296/193.1 |
| 7,455,351 B2 * | 11/2008 | Nakayama et al. | ........ | 296/193.1 |
| 7,497,289 B2 * | 3/2009 | Kwun et al. | ................. | 180/68.4 |
| 7,597,384 B2 | 10/2009 | Wallman et al. | | |
| 7,644,966 B2 * | 1/2010 | Huber et al. | ................... | 293/155 |
| 7,690,722 B2 | 4/2010 | Boggess | | |
| 7,735,226 B2 * | 6/2010 | Riviere et al. | ................. | 29/897.2 |
| 7,887,125 B2 * | 2/2011 | Tazaki et al. | ................ | 296/193.1 |
| 7,926,870 B2 * | 4/2011 | Lorenzo et al. | ............ | 296/193.1 |
| 8,047,603 B2 * | 11/2011 | Goral et al. | ............. | 296/187.03 |
| 8,109,560 B2 * | 2/2012 | Joly-Pottuz | .............. | 296/187.04 |
| 8,220,576 B2 * | 7/2012 | Terada et al. | ................ | 180/68.4 |
| 8,308,225 B2 * | 11/2012 | Owen et al. | ............. | 296/193.09 |
| 2002/0096378 A1 | 7/2002 | Kobayashi | | |

(Continued)

FOREIGN PATENT DOCUMENTS

EP 2133246 A1 12/2009

*Primary Examiner* — Pinel Romain
(74) *Attorney, Agent, or Firm* — Raymond L. Coppiellie; Brooks Kushman P.C.

(57) ABSTRACT

A pedestrian-friendly forward structure of a motor vehicle includes a grill opening reinforcement (GOR), a front fascia located forward of and spaced from the GOR, and a support bracket extending transversely to the vehicle forward of the GOR and rearward of the front fascia. The support bracket has a transverse cross-bar and left and right legs extending rearward from a cross-bar adjacent opposite ends thereof. The legs are attached to respective outboard positions on the GOR, and the cross-bar has an upper flange underlying an upper rear panel of the front fascia. If a pedestrian strikes the forward structure, the fascia and support bracket yield rearward in an injury-reducing manner.

18 Claims, 4 Drawing Sheets

(56) References Cited

U.S. PATENT DOCUMENTS

| | | | |
|---|---|---|---|
| 2004/0080183 A1* | 4/2004 | Andre et al. | 296/193.04 |
| 2004/0094976 A1* | 5/2004 | Cate et al. | 293/120 |
| 2005/0134093 A1* | 6/2005 | Borkowski et al. | 296/203.02 |
| 2005/0140173 A1* | 6/2005 | Riviere et al. | 296/187.01 |
| 2008/0191500 A1* | 8/2008 | Kondou et al. | 293/117 |
| 2010/0163324 A1* | 7/2010 | Jyoutaki et al. | 180/68.1 |
| 2011/0210579 A1* | 9/2011 | Marur et al. | 296/187.03 |
| 2012/0043786 A1* | 2/2012 | Challal et al. | 296/203.02 |

\* cited by examiner

PEDESTRIAN-FRIENDLY STRUCTURE FOR MOTOR VEHICLE FRONT END

TECHNICAL FIELD

The present invention relates to a front end structure for a motor vehicle having characteristics intended to reduce injury to a pedestrian during a vehicle/pedestrian collision.

BACKGROUND

It is desirable to design a motor vehicle, and particularly the structure of the front end of the vehicle, to reduce the likelihood and/or severity of injuries suffered by a pedestrian that may be struck by the vehicle. It is a challenge to design a front end structure that is able to yield or collapse in order to absorb kinetic energy while still obtaining adequate fit/finish and proper dimensional stability.

A common vehicle front end structure includes a grill opening reinforcement (GOR) extending transversely across the front of the vehicle to provide structural support for components such as the front fascia, head lamp modules, and hood latch base. The GOR is typically fabricated of metal and/or reinforced plastic and is supported at least at its outboard ends by vehicle structural frame components, such as longitudinal frame rails and/or front sub-frame.

SUMMARY

In a first described embodiment, forward structure for a motor vehicle comprises a grill opening reinforcement (GOR) extending transversely to the vehicle, a front fascia located forward of and spaced from the GOR, and a support bracket extending generally transversely to the vehicle forward of the GOR and rearward of the front fascia. The support bracket comprises a transverse cross-bar and left and right legs extending rearward from a cross-bar adjacent opposite ends thereof. The legs are attached to respective outboard positions on the GOR, and the cross-bar has an upper flange underlying an upper rear panel of the front fascia.

In another embodiment described herein, the cross-bar comprises an upper flange which contacts and supports an underside of the front fascia upper rear panel, a web extending downward from the upper flange, and a lower flange extending rearward from a bottom edge of the web. The cross-bar cross section allows the support bracket to yield in a pedestrian-friendly manner during a vehicle/pedestrian collision, while providing adequate support for the fascia during normal vehicle operation.

In another embodiment described herein, the support bracket legs extend downward and rearward from the cross-bar to position a highest portion of the cross-bar above the GOR. This placement of the cross-bar relative to the GOR makes it more likely that the support bracket will absorb a pedestrian impact if a favorable manner.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
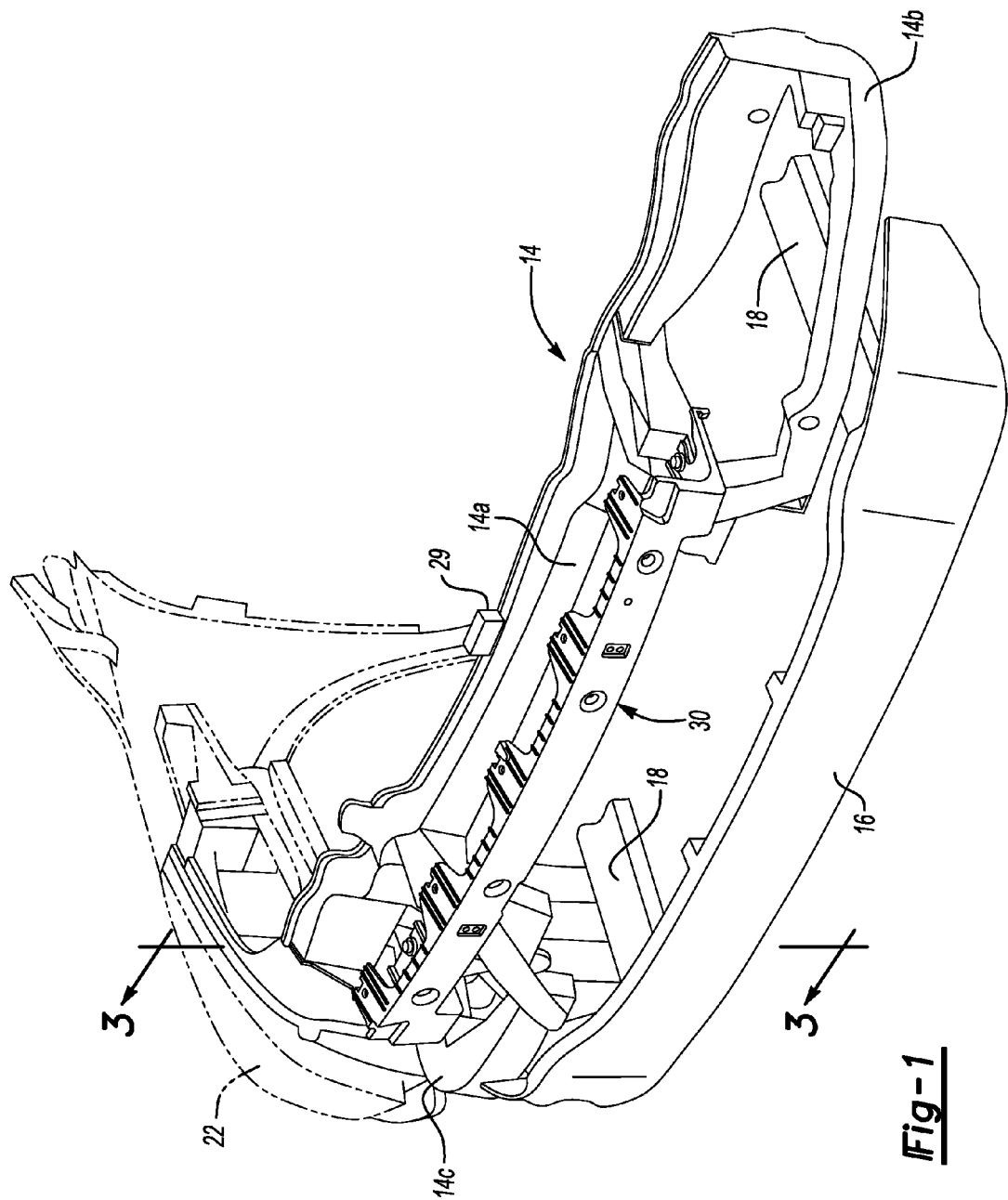
FIG. 1 is a schematic partial view of a motor vehicle front end structure showing a support bracket attached to a grill opening reinforcement.
Figure 2:
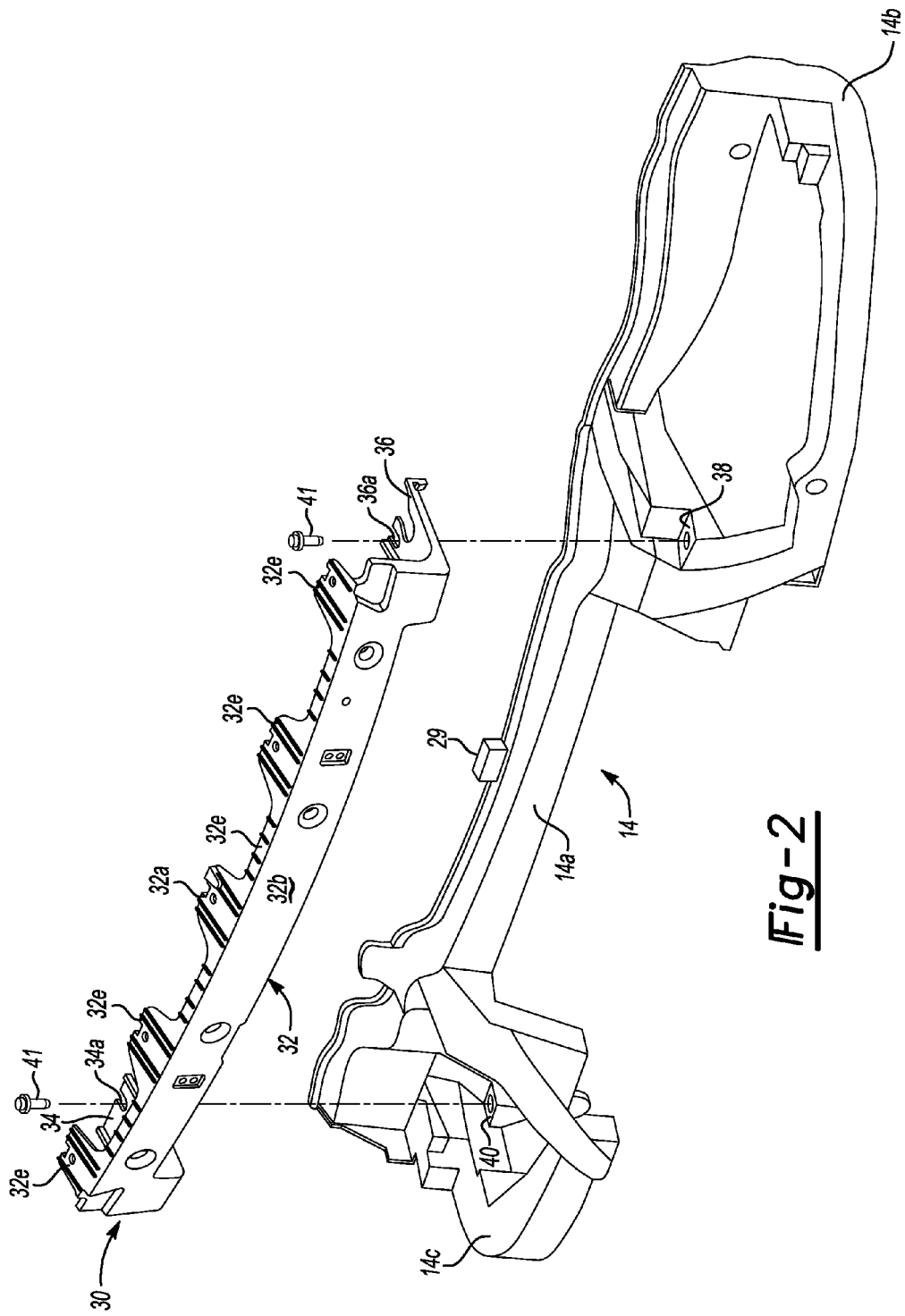
FIG. 2 is a view similar to FIG. 1 showing the support bracket "exploded-out" from the grill opening reinforcement.

As seen in FIGS. 1 and 2, front end structure of a motor vehicle generally comprises a grill opening reinforcement (GOR) 14, a front bumper beam 16, and forward frame rails 18. GOR 14 is supported by frame rails 18, and may be attached thereto by bolts or other conventional means of attachment during vehicle assembly. The forward-most portions of frame rails 18 to which GOR 14 is attached may comprise crush-cans designed to plastically deform to absorb energy applied to bumper beam 16 during a front-end collision.

Figure 3:
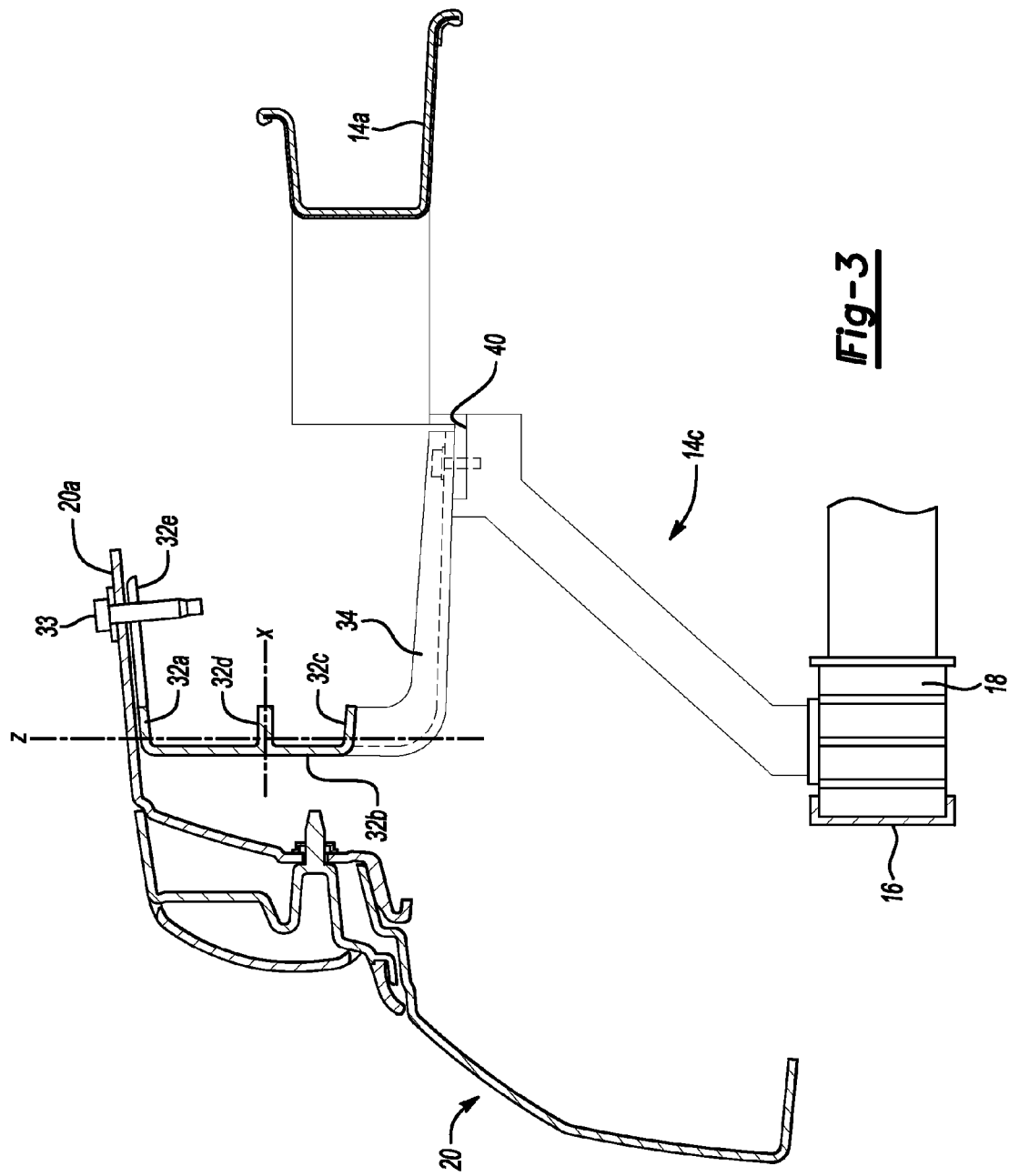
FIG. 3 is a schematic vertical cross section along line 3-3 of FIG. 1.

A front fascia 20 (see FIG. 3) is formed of a relatively flexible plastic or plastic composite material and covers one or more of the front end components to provide a desired appearance and improve vehicle aerodynamics. Front fascia 20 may be a unitary component or may be comprised of two or more component parts (as is the case in the embodiment depicted in FIG. 3) attached to another by any known fastening means.

As best seen in FIG. 2, GOR 14 generally comprises a transversely extending upper beam 14a and right and left corner portions 14b, 14c extending generally forward and downward relative to upper beam and attached to forward frame rails 18.

Various vehicle components may be attached to and supported by GOR 14, such as head-lamp housings (right head-lamp housing indicated at 22), a hood latch base/release mechanism 29, hood bumpers, hood prop rod, horn assembly, radiator, and an active grille shutter system.

A support bracket 30 generally comprises a cross-bar 32 extending transversely across the front of the vehicle forward of GOR 14, and right and left legs 34, 36 extending rearward from the cross-bar. Legs 34, 36 are attached to respective mounting points 38, 40 forward of upper beam 14a. Legs 34, 36 may be secured to mounting points 38, 40 by bolts 41 which pass through elongated slots 34a, 36a in the respective legs and engage threaded holes in the mounting points. Slots 34a, 36a extend along the longitudinal direction of the vehicle to permit a limited amount of fore/aft movement of support bracket 30 relative to GOR 14 during assembly of the forward structure.

Cross-bar 32 comprises an upper flange 32a and a web 32b extending generally downward from the upper flange. Fascia 20 (see FIG. 3) comprises an upper rear panel 20a that extends over and contacts upper flange 32a so that the cross-bar 32 supports front fascia 20. The section modulus of cross-bar 32 about the x-axis (indicated in FIG. 3) should be large enough to resist deflection when front fascia 20 is subjected to generally vertical loading as may occur during normal vehicle use, such as person leaning against or sitting on the fascia. The section modulus of cross-bar 32 about the z-axis (indicated in FIG. 3) may be somewhat smaller, so that the cross-bar is able to deflect rearward.

Support bracket 30 is preferably formed of a material having a high elastic modulus such as, for example, fiber-reinforced plastic or metal. Cross-bar 32 may further comprise a lower flange 32*c* and a mid-web stiffening rib 32*d* as necessary to add to the overall stiffness and stability of the bracket and to help the cross-bar resist vertically applied loads.

Upper flange 32*a* may further comprise a plurality of spaced-apart extended length portions 32*e* that project rearward a greater distance than the narrower portions of the upper flange 32*a* between the extensions. Extended length portions 32*e* provide an increased area of contact with the lower surface of fascia upper rear panel 20*a*, and may also provide locations for fasteners (such as bolts 33) securing the fascia to the support bracket.

Figure 4:
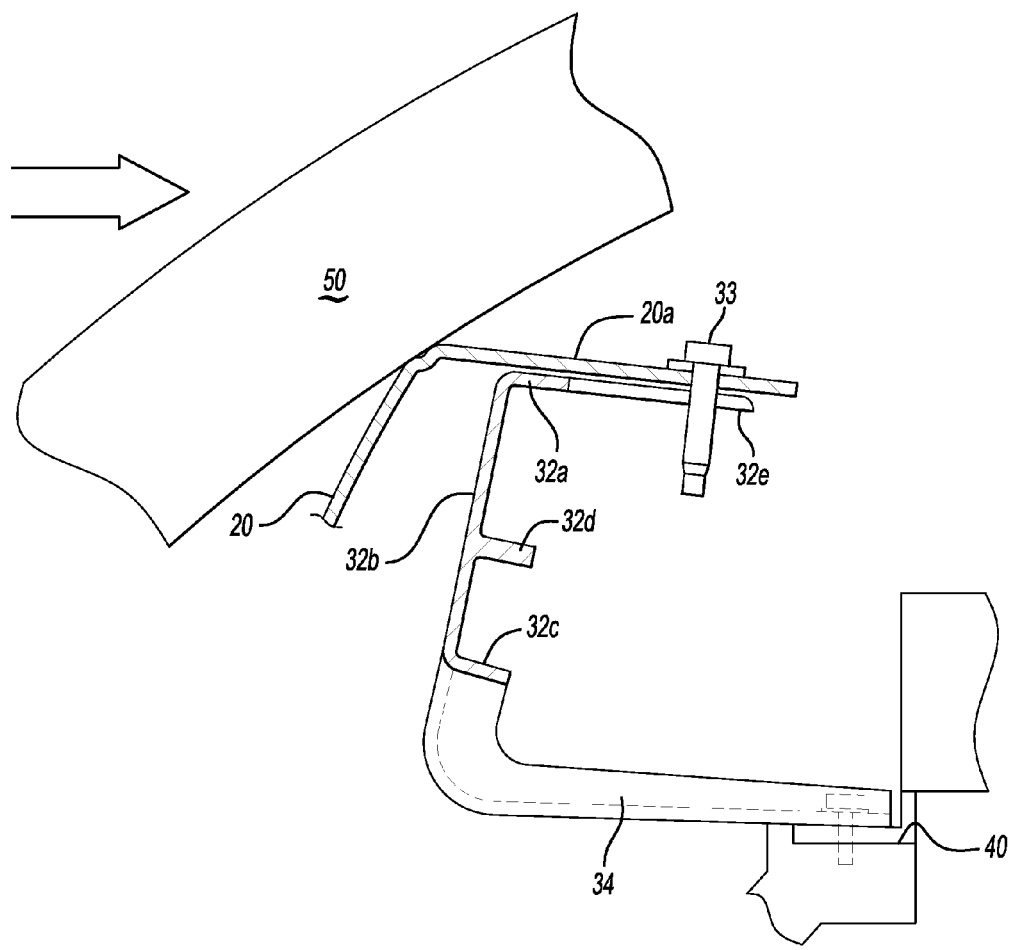
FIG. 4 is a schematic cross sectional view showing the support bracket deflecting during a simulated pedestrian impact.

FIG. 4 schematically shows a pedestrian protection test in which a leg-form 50 (simulating a leg of a pedestrian) strikes the upper portion of the vehicle front end. As front fascia 20 yields rearward (to the right as shown in the figure) impact loads are transferred to support bracket 30. The modulus of cross-bar 32 about the z-axis section (indicated in FIG. 3) is preferably smaller than the x-axis section modulus, so that the center section of the cross-bar is able to deflect or bow rearward in the manner of a simply-supported beam to absorb impact energy.

Under certain pedestrian impact conditions the leg(s) 34, 36 may deflect in the manner of a cantilever beam such that cross-bar 32 rotates rearward and downward about the z-axis (clockwise as depicted in FIG. 4) to absorb energy. This may occur, for example, if the impact loading is relatively high and/or applied relatively far outboard on bracket 30, close to one or both of legs 34, 36.

In previously known vehicle structures, the GOR is positioned more forwardly than in the present disclosure and the front fascia is mounted directly to the GOR. Since the GOR must be of relatively strong and rigid construction to adequately support the other vehicle components attached thereto, this leads to the front end structure being relatively unyielding.

In comparison to the previously known vehicle structures described above, the GOR upper beam 14*a* is shifted to the rear and a less rigid support bracket 30 is inserted into the horizontal space thus created forward of the GOR. Rearward deflection of the support bracket 30 into this horizontal space during a pedestrian impact allows the overall front-end structure to be more pedestrian-friendly.

Support bracket 30 may be designed to yield elastically and so resist permanent damage under a relatively mild pedestrian impact, but yield plastically and/or fail under a severe impact if required to absorb a large amount of impact energy in order to prevent injury to the pedestrian.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Motor vehicle structure comprising:
    a grill opening reinforcement (GOR) comprising an upper beam extending transversely to the vehicle;
    a front fascia located forward of and spaced from the GOR; and
    a support bracket comprising a cross-bar extending transversely to the vehicle forward of the GOR and supporting the front fascia, and left and right legs extending rearward from the cross-bar adjacent opposite ends thereof and attached to respective outboard positions on the GOR, the legs being the only load-bearing connection between the cross-bar and the GOR such that the cross-bar may function as a simply-supported beam to absorb energy of a pedestrian impact on the front fascia.

2. The structure of claim 1 wherein the cross-bar comprises an upper flange contacting an underside of an upper rear panel of the front fascia, a web extending downward from the upper flange, and a lower flange extending rearward from a bottom edge of the web.

3. The structure of claim 2 wherein the front fascia upper rear panel is attached to the cross-bar upper flange.

4. The structure of claim 3 wherein the cross-bar upper flange comprises a plurality of spaced-apart, extended-length portions having attachment points to which the front fascia upper rear panel is attached.

5. The structure of claim 1 wherein the legs further extend downward from the cross-bar to position a highest portion of the cross-bar above the GOR.

6. The structure of claim 1 further comprising a hood latch base disposed on the GOR upper beam.

7. Motor vehicle structure comprising:
    a grill opening reinforcement (GOR) attachable to a forward vehicle frame and comprising an upper beam extending transversely to the vehicle;
    a support bracket comprising a cross-bar disposed forward of the GOR and extending transversely to the vehicle, the cross-bar being connected in a load-bearing manner to the GOR only at a left and a right outboard end thereof such that the cross-bar may function as a simply-supported beam to absorb energy of a pedestrian impact; and
    a front fascia having a an upper rear panel overlying and supported by the cross-bar.

8. The structure of claim 7 wherein the support bracket further comprises a left and a right leg extending downward and rearward from the cross-bar adjacent to opposite ends thereof, the legs attached to the GOR to serve as the load-bearing connection between the cross-bar and the GOR and position the cross-bar higher than the GOR.

9. The structure of claim 7 wherein the cross-bar comprises an upper flange, a web extending downward from the upper flange, and a lower flange extending rearward from a bottom edge of the web.

10. The structure of claim 9 wherein the front fascia upper rear panel is attached to the cross-bar upper flange.

11. The structure of claim 10 wherein the cross-bar upper flange comprises a plurality of spaced-apart, extended-length portions having attachment points to which the front fascia upper rear panel is attached.

12. The structure of claim 7 further comprising a hood latch base disposed on the GOR upper beam.

13. Motor vehicle structure comprising:
    a forward vehicle frame;
    a grill opening reinforcement (GOR) attached to the forward vehicle frame, an upper beam of the GOR extending transversely to the vehicle;
    a support bracket comprising a cross-bar extending transversely to the vehicle, and left and right legs extending from the cross-bar adjacent respective outboard ends thereof, the left and right legs extending rearward from the cross-bar and attached to the GOR to locate the cross-bar forward of the GOR, the legs being the only load-bearing connection between the cross-bar and the GOR such that the cross-bar may function as a simply-supported beam to absorb energy of a pedestrian impact; and a front fascia disposed forward of the GOR and having an upper rear panel attached to the support bracket cross-bar.

14. The structure of claim 13 wherein the cross-bar comprises an upper flange contacting an underside of the front fascia upper rear panel, a web extending downward from the upper flange, and a lower flange extending rearward from a bottom edge of the web.

15. The structure of claim 14 wherein the front fascia upper rear panel is attached to the cross-bar upper flange.

16. The structure of claim 15 wherein the cross-bar upper flange comprises a plurality of spaced-apart, extended-length portions having attachment points to which the front fascia upper rear panel is attached.

17. The structure of claim 13 wherein the legs further extend downward from the cross-bar to position a highest portion of the cross-bar above the GOR.

18. The structure of claim 13 further comprising a hood latch base disposed on the GOR upper beam.

\* \* \* \* \*